Jan. 15, 1935.    J. F. McCANN ET AL    1,988,421
DRIVING MECHANISM
Filed Sept. 19, 1933
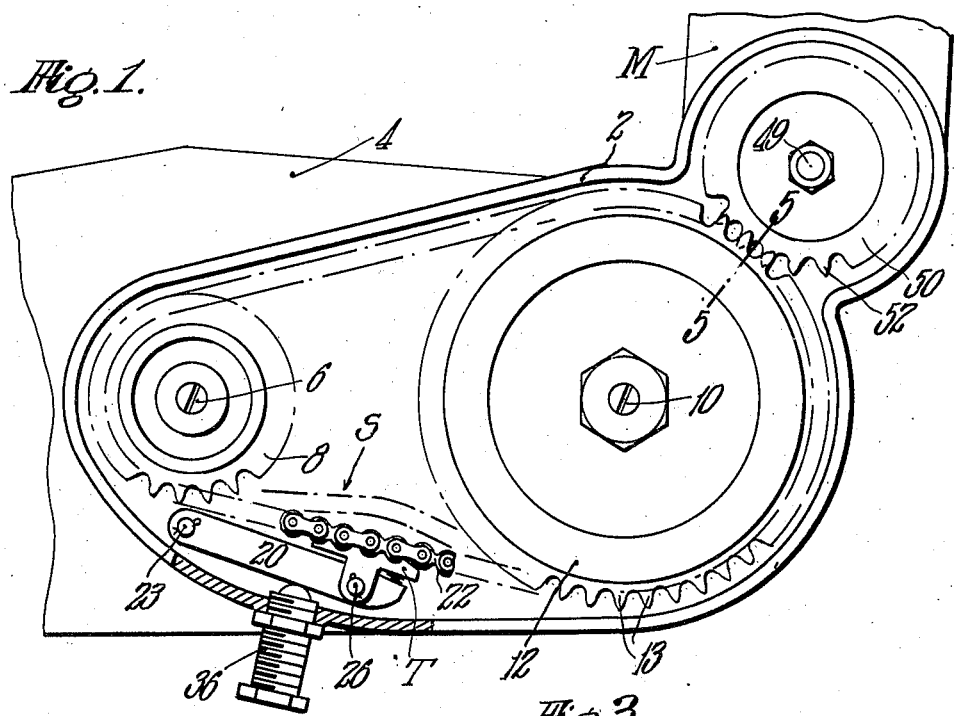
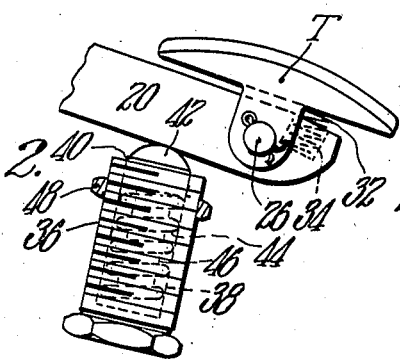
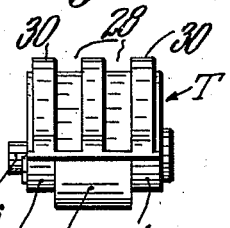
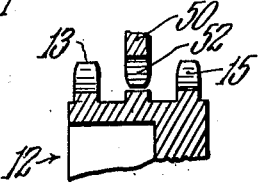
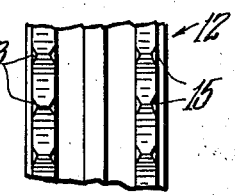
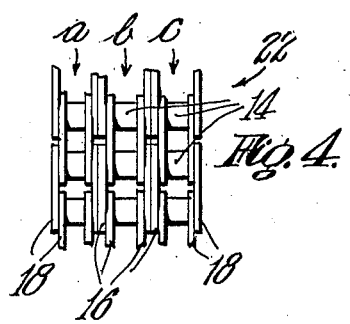
INVENTORS.
John F. McCann and
Carl E. Johnson.
BY
Walter C. Ross
ATTORNEY.

Patented Jan. 15, 1935

1,988,421

UNITED STATES PATENT OFFICE 1,988,421

DRIVING MECHANISM

John F. McCann and Carl E. Johnson, Springfield, Mass., assignors to Baldwin-Duckworth Chain Corporation, Springfield, Mass., a corporation of Massachusetts Application September 19, 1933, Serial No. 690,087

3 Claims. (Cl. 64—5)

This invention relates to improvements in driving mechanism and is directed more particularly to improvements in chain drive mechanism for connecting driving and driven elements.

According to one novel feature of the invention a chain drive mechanism is provided for operatively connecting a primary driving element and a driven element or elements which includes novel adjustable means for automatically taking up the slack in or tightening the chain thereof. This insures proper tension of the chain at all times whereby the many objections incident to slackness in the chain are overcome.

According to another novel feature of the invention, the driving mechanism which includes an endless chain associated with primary driving and driven elements is utilized for driving another element thus obviating the use of an independent or separate chain and sprockets or other driving connections between the primary driving and driven elements and the said other driven element.

Numerous other novel features and advantages of the invention will be more fully hereinafter referred to in connection with the accompanying description, from which it will be understood that the invention is adapted for general use.

In order to facilitate a clear understanding of the invention, however, it will be described in connection with its use on a motorcycle, but it will be understood that the invention is not to be construed as limited to such use and that various changes and modifications may be made in the form thereof without departing from the spirit and scope of the invention. In the drawing:

Fig. 1 is an elevational view showing the novel features of the invention associated with certain parts common to a motorcycle.

Fig. 2 is an enlarged elevational view of the chain-tightening or slack-take-up feature of the invention.

Fig. 3 is an end elevational view of the chain-engaging shoe shown in Fig. 2.

Fig. 4 is a fragmentary plan view of one form of chain adapted for the practice of the invention.

Fig. 5 is a sectional view on the line 5—5 of Fig. 1, and

Fig. 6 is an edge view of a sprocket which may be driven from the primary drive.

Referring now to the drawing more in detail the invention will be fully described.

As previously mentioned, the novel features of the invention are adapted for broad application but in order to facilitate a clear understanding thereof it will be disclosed as applied to a motorcycle, it being understood that such a disclosure is merely for purposes of description.

In Fig. 1 there is shown at 2 a housing or casing which may function as a support and which is disposed at the forward side of the motorcycle engine. At 4 is represented the engine base and at 6, the crank shaft, which may be called the primary driving element. A toothed drive member 8 in the form of a sprocket is suitably associated with the drive shaft 6. 10 represents a driven element which in this case is the in-put shaft of a transmission of a motorcycle from which the rear or driving wheel of the motorcycle is driven.

A second toothed driven member in the form of a sprocket 12 is associated with the shaft 10. This is operatively connected to and driven from the sprocket 8 by a chain indicated generally by 22. This chain will preferably be of the multiple strand type. In such a chain separate strands or rows *a*, *b*, and *c* of tooth-engaging elements such as bushings or rollers 14 are provided and are associated with intermediate links 16 between the bushings or rollers and outer links 18.

The sprockets are provided with sets of teeth or with circumferential rows of teeth, each separate row being adapted to engage and coact with the bushings or rollers of one of the strands or rows of the chain. Of course there may be as many strands or rows of bushings or rollers in the chain and as many sets or rows of teeth on the sprockets as may be desired. This will depend more or less upon the purpose for which the drive is to be employed. It will be sufficient for purposes of disclosure to refer to the chain as being of the multiple-strand type.

As is well-known, in the normal operation of a chain drive of the type shown and described, the chain tends to elongate and become slack due principally to wear of its component parts. The elongation and slackness of course results in unsatisfactory operation and other objections incident thereto.

According to this invention, novel means is provided to automatically tighten or take up slack in the chain which includes means for adjustment to maintain the same in condition for its automatic operation.

According to the preferred form of this part of the invention a lever or arm 20 is pivoted as on a pin 23 which may be suitably associated with the casing or support 2. A chain-engaging member T which may be called a shoe, is movable on the arm 20. This may be accomplished by means of cheeks 24 of the shoe located at either side of the arm 20 adjacent its outer end which rock on a pin 26 passing through the arm and cheeks of the shoe.

The upper face or chain-engaging part of the shoe T is relatively long for purposes which will later appear and is preferably curved, as shown. This surface is provided with alternate grooves 28 and ridges 30 so that with a multiple-strand chain such as shown and described, the intermediate links thereof pass through the grooves 28 while the bushings or rollers of the chain ride on the ridges 30 as will be apparent. A spring or other yielding means 32 is preferably disposed in a socket 34 of the arm 20 and is adapted to bear against the underside of the shoe T. This spring 32 tends to urge the shoe upwardly on pivot 26 so that its ridges 30 bear on the rollers or bushings of the chain.

An adjuster 36 is in screw-threaded engagement with the casing or support and is bored out as at 38. A plug 40 has a suitably shaped upper end 42 for bearing on the underside of the lever 20. This plug is slidable in the bore of the adjuster and a spring 44 within the bore 38 tends to urge the plug member 40 upwardly. A shank 46 may be provided on the plug to fit within the spring 44.

Thus, the adjuster 36 may be moved up and down for adjusting purposes and a lock nut or nuts 48 is provided to lock it in its adjusted positions.

As the chain becomes slack it tends, by reason of centrifugal whip, to travel through a curved path between the sprockets 8 and 12 as indicated by the dot-dash lines S in Fig. 1. The parts of the tightener are so constructed and arranged that the shoe T yieldingly bears on the outer or back side of the chain to take up the slack therein. Since the upper face of the shoe is preferably curved, it causes the chain to travel in the curved path between the sprockets that it would normally assume when operating in a slack condition.

Normally, the spring-pressed plug member 40 bearing on the lever or arm 20 yieldingly urges the arm and shoe upwardly so that such slackness as may gradually occur is taken up automatically. As the slack increases, however, the adjuster 36 may be moved to such a position relative to the arm and shoe that they are at all times automatically urged into a slack-eliminating position.

It will be noticed that the chain-engaging part of the shoe is relatively long and formed to approximate the curvature of the chain when it is slack. Instead of acting on the chain in a direction opposed to the direction which it would naturally take, this invention makes it possible to exert a slack-removing tension thereagainst without undue pressure and consequent friction and wear. The chain merely slides or rides on the shoe which, of course, may be of any suitable material. The shoe is yieldable on the arm while the arm itself is yieldable whereby the tightening function is accomplished by yielding pressure.

According to another feature of the invention another element or elements may be driven by the driving mechanism described. To accomplish this, one row of teeth of the sprocket 12, as, for instance, an intermediate row of teeth, is omitted so that there are one or more sets or rows of teeth 13 and 15 at either side of what may be termed a circumferential slot.

A driven element 50 which in this case may represent the sprocket of a magneto, generator or the like is disposed so that the teeth 52 thereof are disposed in the slot between the teeth 13 and 15 of the sprocket 12.

The outer strands of driving elements 14 of the chain engage the outer rows of teeth 13 and 15 of the sprocket 12 while the intermediate row or strand of elements overlie the slot of sprocket 12 and engage the teeth 52 of the sprocket 50.

Thus, as the sprocket 12 is driven by means of the chain from the sprocket 8 the said chain is utilized to drive the sprocket 50 whereby the necessity of other driving connections such as gears, sprockets, chains, belts and pulleys or the like between the shaft 10 and shaft 49 of the magneto or other unit is obviated. By this means the additional unit is positively driven in a simple and efficient manner, all to the end that the entire structure may be compact, simple in form and positive in its operation.

It will be appreciated that the chain may be of the roller or bushing type and that it may consist of as many strands or rows of driving elements as may be desired. Also, it will be understood that the chain may be of the silent type and that not only may the slack take-up device be employed but another driven element such as a sprocket may be used in connection therewith.

Various changes and modifications may be made in the form of the invention to adapt it for use with various types of machines and apparatus. Therefore it is not desired to be limited by the foregoing description of the present preferred form of the invention, but, if at all, by the appended claims. What it is desired to claim and secure by Letters Patent of the United States is:

1. Driving mechanism for a motorcycle and the like comprising in combination, a support, spaced driving and driven shafts having sprockets thereon, an endless chain engaging the teeth of said sprockets including separate rows of spaced driving elements and intermediate and outer rows of links, a relatively rigid arm pivotally connected at one end to said support for rocking movements having a free end movable towards and away from a run of said chain between said sprockets, a relatively rigid shoe mounted for rocking movements on said arm adjacent the free end thereof having an upper side adjacent said run of the chain formed with longitudinally extending alternate ridges and grooves, the said ridges having relatively non-yieldable faces convexly curved from end to end of the upper side of the shoe in the arc of a curve approximating the normal curvature of the said run of the chain when slack and adapted to bear simultaneously against a plurality of adjacent driving elements of the chain, the said grooves being formed to permit the links of the chain to freely pass therepast out of contact with the sides and bottoms of the grooves, yielding adjusting means associated with the support between said free end of the arm and its pivotal connection with the support to urge the arm towards said run of the chain and cause the shoe to rock on said arm so that the faces of the ridges thereof bear on a plurality of adjacent driving elements of the chain.

2. Driving mechanism for a motorcycle and the like comprising in combination, a support, spaced driving and driven shafts having sprockets thereon, an endless chain engaging the teeth of said sprockets including separate rows of spaced driving elements and intermediate and outer rows of links, a relatively rigid arm pivotally connected at one end to said support for rocking movements having a free end movable towards and away from a run of said chain between said sprockets, a relatively rigid shoe mounted for rocking movements on said arm adjacent the free end thereof having an upper side adjacent said run of the chain formed with longitudinally extending alternate ridges and grooves, the said ridges having relatively non-yieldable faces convexly curved from end to end of the upper side of the shoe in the arc of a curve approximating the normal curvature of the said run of the chain when slack and adapted to bear simultaneously against a plurality of adjacent driving elements of the chain, the said grooves being formed to permit the links of the chain to freely pass therepast out of contact with the sides and bottoms of the grooves, yielding adjusting means associated with the support between said free end of the arm and its pivotal connection with the support to urge the arm towards said run of the chain and cause said shoe to rock on said arm so that the faces of the ridges thereof bear on a plurality of adjacent driving elements of the said chain, the said yielding adjusting means including a member in threaded engagement with said support and a spring-pressed member movable thereto bearing on said arm.

3. Driving mechanism for a motorcycle and the like comprising in combination, a support, spaced driving and driven shafts having sprockets thereon, an endless chain engaging the teeth of said sprockets including separate rows of spaced driving elements and intermediate and outer rows of links, a relatively rigid arm pivotally connected at one end to said support for rocking movements having a free end movable towards and away from a run of said chain between said sprockets, a relatively rigid shoe mounted for tilting movements on said arm adjacent the free end thereof having an upper side adjacent said run of the chain formed with longitudinally extending alternate ridges and grooves, the said ridges having relatively non-yieldable faces convexly curved from end to end of the upper side of the shoe in the arc of a curve approximating the normal curvature of the said run of the chain when slack and adapted to bear simultaneously against a plurality of adjacent driving elements of the chain, the said grooves being formed to permit the links of the chain to freely pass therepast out of contact with the sides and bottoms of the grooves, yielding adjusting means associated with the support between said free end of the arm and its pivotal connection with the support to urge the arm towards said run of the chain, the said yielding adjusting means including a member in threaded engagement with said support having a spring-pressed part bearing on said arm, and yielding means between said shoe and said arm to tilt the shoe relative to said arm so that the faces of the ridges of the shoe bear on a plurality of driving elements of the chain.

JOHN F. McCANN.
CARL E. JOHNSON.